United States Patent [19]

Wang

[11] Patent Number: 4,832,318

[45] Date of Patent: May 23, 1989

[54] LIFTING TELESCOPING TUBE

[76] Inventor: John Wang, No. 129, Tuan-Chu Lane, Tuan-Chu Li, Chiayi city, Taiwan

[21] Appl. No.: 166,139

[22] Filed: Mar. 10, 1988

[51] Int. Cl.[4] ............................. F16F 5/00; F16F 9/00
[52] U.S. Cl. ..................................... 267/120; 188/282; 188/300; 188/322.15; 188/317; 267/64.12; 267/64.15; 267/64.26; 267/124; 293/134
[58] Field of Search ............... 188/282, 281, 317, 300, 188/67, 322.14, 269, 322.15, 322.18, 322.19, 322.22; 267/64.11–64.27, 120–129, 116; 292/338; 403/83, 103, 106, 109; 92/30, 29, 15–28; 248/351; 296/76, 56; 16/51, 52, 66, 70; 293/134

[56] References Cited

U.S. PATENT DOCUMENTS

| | | | |
|---|---|---|---|
| 2,564,790 | 8/1951 | Orloff et al. | 267/64.15 |
| 3,426,651 | 2/1969 | Arendarski | 267/64.12 X |
| 3,762,514 | 10/1973 | Freitag | 188/300 |
| 3,801,087 | 4/1974 | Akaike et al. | 293/134 X |
| 3,804,443 | 4/1974 | Komatsu | 267/116 X |
| 3,817,566 | 6/1974 | Keijzer et al. | 293/134 |
| 3,853,311 | 12/1974 | Kreuzer et al. | 267/116 X |
| 3,944,270 | 3/1976 | Kreuzer | 267/120 X |
| 3,977,304 | 8/1976 | Meissner | 92/30 |
| 4,428,567 | 1/1984 | Fournales | 188/322.18 X |
| 4,433,759 | 2/1984 | Ichinose | 267/120 X |
| 4,437,548 | 3/1986 | Ashiba | 267/64.26 X |
| 4,480,497 | 11/1984 | Locher | 403/108 X |
| 4,629,167 | 12/1986 | Kimura et al. | 267/64.12 X |
| 4,662,771 | 5/1987 | Roe et al. | 403/108 |

FOREIGN PATENT DOCUMENTS

| | | | |
|---|---|---|---|
| 0064329 | 6/1978 | Japan | 267/120 |
| 0061837 | 4/1982 | Japan | 188/300 |
| 0241214 | 10/1986 | Japan | 267/120 |

Primary Examiner—Douglas C. Butler
Attorney, Agent, or Firm—Lackenbach Siegel Marzullo & Aronson

[57] ABSTRACT

The invention discloses a lifting telescoping tube which comprises a first tube receiving a pressure liquid, a second tube filled with a pressure gas, a first piston affixed to one open end of the second tube having a first through-passage and a second through-passage intercommunicating the first and second tubes, a check valve disposed in the second through-passage for preventing the pressure liquid from flowing into the first tube from the second tube, a second piston provided in the second tube dividing the second tube into a variable-volume liquid chamber and a variable-volume gas chamber.

3 Claims, 2 Drawing Sheets

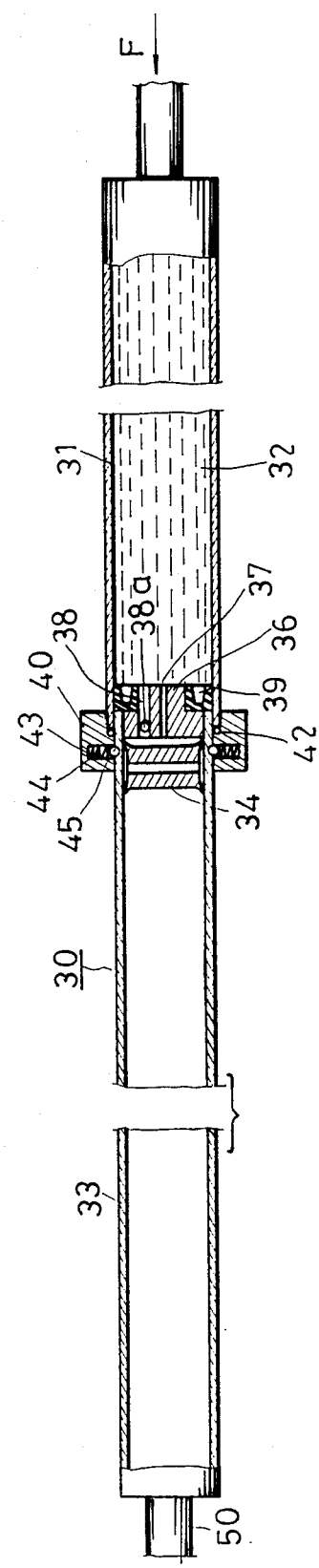
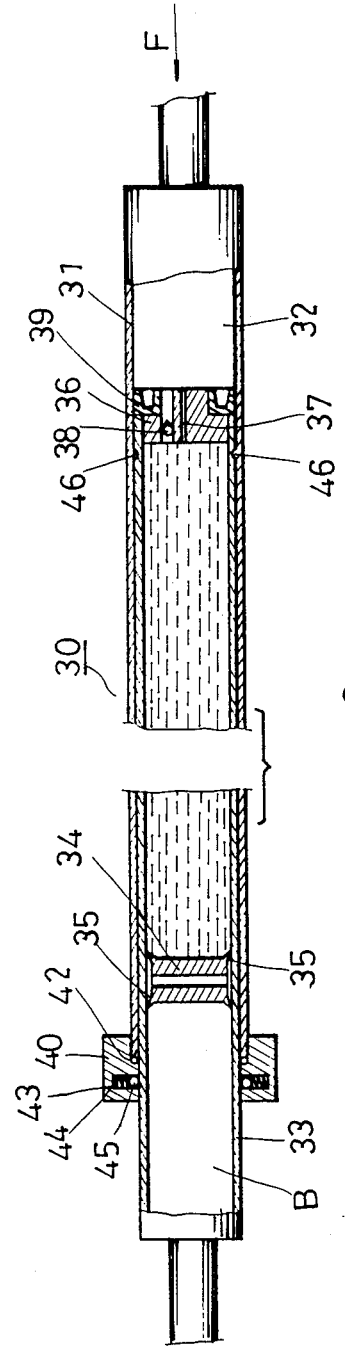
FIG. 2
FIG. 3

LIFTING TELESCOPING TUBE

BACKGROUND OF THE INVENTION

The present invention relates to a telescoping tube, and more particularly to a telescoping tube used automatically lift a door or similar device.

A telescoping tube can be filled with high pressure gas for lifting purposes, for example lifting a garage door or an automobile trunk lid, or other similar equipment requiring a lifting force. As shown in FIG. 1, a conventional telescoping tube used for lifting the trunk lid of a car is composed of a gas tube 10 with a piston rod 20. The gas tube 10 is filled with high pressure gas, such as nitrogen, and a lubricating oil. At one end of the gas tube 10 is provided a connecting piece 11 to be connected to the lid. A pair of sealing rings 12 and 13 are fixed in the tube 10 by engaging with annular projections 121 and 131 extending inwardly from the inner side of the tube 10, The annular projections 121, 131 are formed by a press process. A flexible gas-seal ring 14 is positioned between the fixed sealing rings 12 and 13. The piston rod 20 is connected to a piston 21 and extends outward from the closed end of the gas tube. A connecting piece 23 which is to be connected to the car body is attached to the outer end of the piston rod 20. When the user closes the trunk lid by applying a force F, the piston 21 is moved inward, dividing the gas tube 10 into two chambers. The piston 21 has a passage 22 to permit gas to flow therethrough during operation.

The above-mentioned prior art construction of the telescoping tube has two prominent shortcomings. First, the high pressure nitrogen gas within the gas tube 10 is liable to leak and a high precision process is needed to construct the fixed sealing ring 12, 13 and gas-seal ring 14 so as to achieve an effective gas-seal. In addition, after a period of use, the telescoping tube is liable to leak due to wear caused to the sealing ring. Second, once the gas leaks, the gas pressure will decrease and accordingly the lifting force will decrease.

SUMMARY OF THE INVENTION

It is accordingly a primary object of the invention to provide a new telescoping tube device which overcomes leakage and decreased pressure decreasing problems associated with the prior art.

It is a further object of the invention to provide a new telescoping tube which can be actuated slowly at a predetermined speed during lifting, and can be retracted easily during closing.

The main characteristic of the telescoping tube device according to the invention ideally operates with high pressure gas and hydraulic oil. Moreover, the provision of an oil hole and check valve in the piston provide good speed control of the entire telescoping tube during operation.

Therefore, the telescoping tube device according to the invention comprise a first tube having a hydraulic liquid, a second tube having a hydraulic gas, a first piston affixed to and sealingly closed said open end of the second tube, the first piston having a first through-passage and a second through-passage intercommunicating the first and second tubes, and a check valve disposed in the second through-passage for preventing the hydraulic liquid from flowing into the first tube from the second tube, a second piston provided in the second tube, the second piston dividing the second tube into a variable-volume liquid chamber and a variable-volume gas chamber.

Other advantages and characteristics of the invention will become clear from the following detailed description of a preferred embodiment when read in conjunction with the accompanying drawings.

BRIEF DESCRIPTION OF THE DRAWINGS

FIG. 2 is a sectional view of the telescoping tube according to the invention in an expanded condition; and FIG. 3 is a sectional view of the telescoping tube according to the invention in the compressed condition.

DETAILED DESCRIPTION OF THE PREFERRED EMBODIMENT

Figure 1:
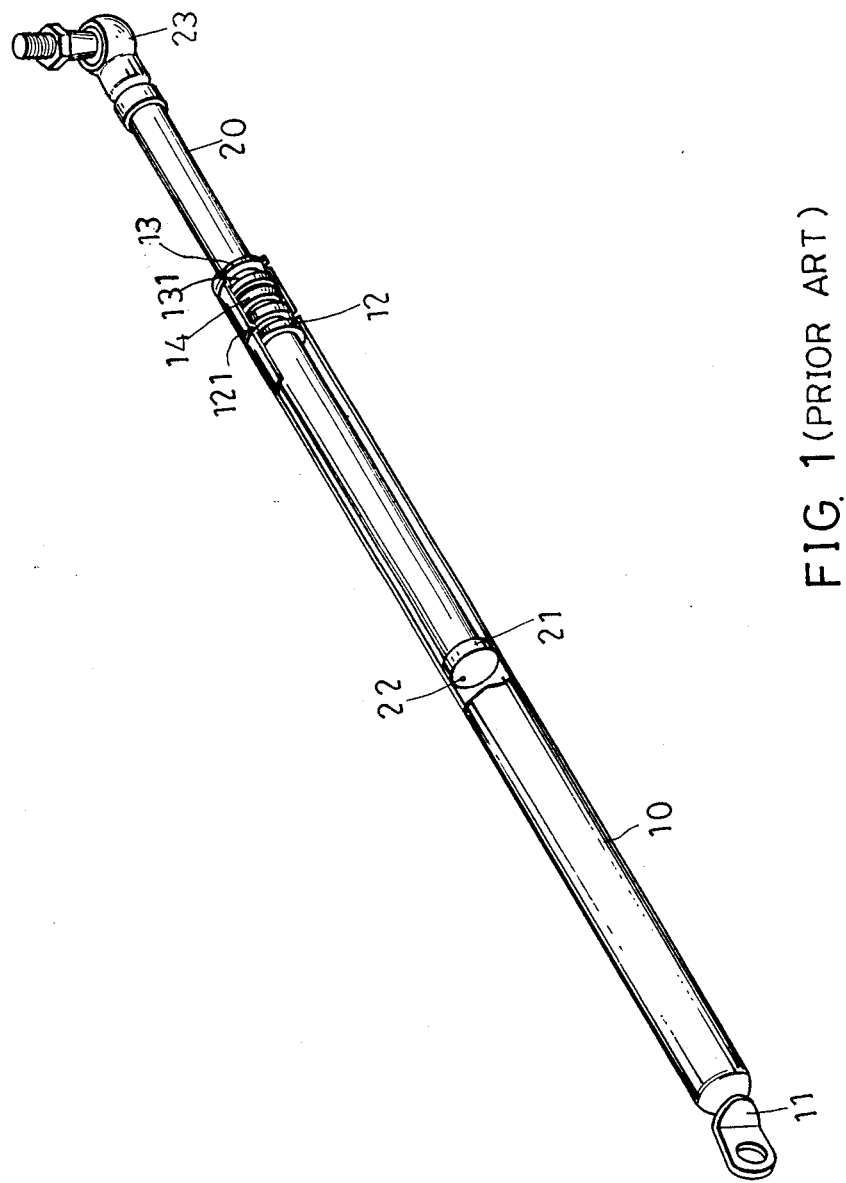
FIG. 1 is a partially sectional perspective view of the conventional telescoping tube.

Referring to FIG. 2 and FIG. 3, the telescoping tube device 30 includes an oil tube 31 filled with hydraulic oil 32; a gas tube 33 provided with a piston 34. The contact part of the movable piston 34 and the gas tube 33 is sealed by means of a cap sealing ring 35, so as to attain a good seal. The open end of the gas tube 33 has a fixed piston 36, and the central part of the piston 36 has an oil hole 37. Moreover, another oil hole 38 with a check valve 38a is provided in the piston 36. Adjacent to the piston 36 is a sealing ring 39. The gas tube 33 is inserted into the oil tube 31. A locking means 40 is threadedly connected to the open end of the oil tube 31. An oil seal 42 is provided between the contact surfaces of the locking means 40 and the tubes 31 and 33. The locking means 40 comprises an engaging means 43 having springs 44 urging steel balls 45. The outside surface of the gas tube 33 is provided with a pair of recesses 46 to engage with the steel balls 45 so as to prevent the tube 33 from being released from the tube 31 when in the expanded position.

In assembly, the telescoping tube 30 according to the present invention is first filled with the hydraulic oil 32 from the oil tube 31, and then the piston 36 of the gas tube 33 is inserted into the tube 31 while the movable piston 34 is being disposed in the gas tube 33. The recesses 46 of the tube 33 are made to engage with the engaging means 43 of the locking means 40. A gas is injected into the gas tube 33 through its gas inlet spout 50.

In operation, as shown in FIG. 3, the telescoping tube according to the invention will retract when an external force causes the hydraulic oil 32 of the oil tube 31 to flow through oil holes 37 and 38. The check valve 38a permits the oil to flow only into the tube 33. As the oil flows into the tube 33, it pushes the piston 34 away from the fixed piston 36 gradually, and the gas of the gas tube 33 is compressed in the chamber. When the external force is removed, the compressed gas pushes the piston 34 toward the direction of the piston 36 and gradually forces the hydraulic oil 32 back to the oil tube 31 through the oil hole 37. In this situation, the check valve 38a is closed, and therefore the lifting speed of the telescoping tube 30 is controlled by the passage of the oil through the oil hole 37.

It can be noted that the flow rate of the liquid from the tube 31 into the tube 33 is greater than that from the tube 33 to the tube 31 due to the check valve 38a. Accordingly, the telescoping tube can retract more easily than it expands. Preferably, the gas compression ratio is arranged to be 3:1 so as to easily compress the telescoping tube.

It can be noted that the telescoping tube 30 of the invention does not leak the gas due to the presence of hydraulic oil and that the fluid-seals can be provided more easily in the telescoping tube than in the conventional device having a cylinder and a piston rod.

Although the invention has been described in terms of certain prefered embodiments, modifications will be apparent to those skilled in the art. All such modifications are intended to be included within the scope of the following claims.

I claim:

1. A lifting telescoping tube device for an automatic trunk lid or garage door, and the like, comprising:

a first tube having a first open end and a first closed end;

a second tube slideably inserted in said first tube through said first open end, said second tube having a second open end inside said first tube and a second closed end;

a hydraulic liquid provided in said first tube;

a gas provided in said second tube;

a first piston affixed to and sealingly closing said second open end, said first piston having a first through-passage and a second through-passage intercommunicating said first and second tubes, said passages being separate one from the other and a check valve disposed in said second through-passage for preventing liquid from flowing into said first tube from said second tube; said first through-passage being continuously open and allowing flow in both directions between said tubes;

a second piston provided in said second tube, said second piston dividing said second tube into a variable-volume liquid chamber and a variable-volume gas chamber, said liquid chamber communicating with said first tube via said through-passages, said second piston being driven away from said second open end by said liquid entering said liquid chamber from said first tube when an external force slides said closed ends toward each other, said gas in said gas chamber being compressed by said movement of said second piston, said second piston being forced by said compressed gas toward said second open end when said external force is removed, said first tube having a locking means around said first open end and said second tube, said locking means including engaging means for engaging with said second tube near said second end, said engaging means including a spring-biased projecting ball, and said second tube having a recess to engage with said ball.

2. A lifting telescoping tube device as claimed in claim 1, further comprising a first sealing ring threadedly disposed in said locking means between said second tube and said first open end.

3. A lifting telescoping tube device as claimed in claim 1, wherein said first piston includes a second sealing ring to seal said second open end.

* * * * *